(12) United States Patent
Kowarschik et al.

(10) Patent No.: US 10,217,215 B2
(45) Date of Patent: Feb. 26, 2019

(54) METHOD FOR ADAPTING THE BRIGHTNESS OF AN X-RAY IMAGE, X-RAY DEVICE, COMPUTER PROGRAM AND DATA MEDIUM

(71) Applicants: Markus Kowarschik, Nürnberg (DE); Andreas Maier, Erlangen (DE); Anton Nekovar, Neunkirchen (DE); Reinhard Stadler, Erlangen (DE)

(72) Inventors: Markus Kowarschik, Nürnberg (DE); Andreas Maier, Erlangen (DE); Anton Nekovar, Neunkirchen (DE); Reinhard Stadler, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 113 days.

(21) Appl. No.: 15/367,866

(22) Filed: Dec. 2, 2016

(65) Prior Publication Data

US 2017/0161895 A1 Jun. 8, 2017

(30) Foreign Application Priority Data

Dec. 4, 2015 (DE) .................. 10 2015 224 331

(51) Int. Cl.
*G06T 7/00* (2017.01)
*G06T 5/00* (2006.01)

(52) U.S. Cl.
CPC .......... *G06T 7/0012* (2013.01); *G06T 5/008* (2013.01); *G06T 2207/10116* (2013.01); *G06T 2207/10121* (2013.01)

(58) Field of Classification Search
CPC .................. G06T 2207/10116–2207/10128
See application file for complete search history.

(56) References Cited

U.S. PATENT DOCUMENTS 5,278,887 A    1/1994  Chiu et al.
5,602,896 A *  2/1997  Diepstraten .......... H04N 5/2258
                                              348/E3.032

(Continued)

OTHER PUBLICATIONS

German office Action for related German Application No. 10 2015 224 331.1 dated Sep. 19, 2016, with English Translation.

*Primary Examiner* — Bobbak Safaipour
(74) *Attorney, Agent, or Firm* — Lempia Summerfield Katz LLC (57) ABSTRACT

A method for adapting the brightness of an X-ray image is provided. The X-ray image is recorded using a filter attenuating X-ray radiation used for recording the X-ray image differently in at least two spatial filter regions. The method includes determining image regions mapping the filter regions from filter parameters and recording geometry parameters describing the filter regions from at least one evaluation line running perpendicular to a boundary between image regions. The method also includes determining, for each evaluation line, a correction value describing a difference in brightness between the image regions from an image value profile along the evaluation line in an evaluation area containing the boundary, determining at least one correction factor from the at least one correction value, and adapting the brightness between the at least two image regions by scaling the image values with the correction factor.

15 Claims, 4 Drawing Sheets

(56) References Cited

U.S. PATENT DOCUMENTS

2005/0207535 A1* 9/2005 Alving .................. A61B 6/488
378/116
2009/0074267 A1* 3/2009 Pedrizzetti ............. A61B 5/055
382/128
2012/0187312 A1 7/2012 Guez

* cited by examiner

METHOD FOR ADAPTING THE BRIGHTNESS OF AN X-RAY IMAGE, X-RAY DEVICE, COMPUTER PROGRAM AND DATA MEDIUM

CROSS-REFERENCE TO RELATED APPLICATIONS

The present patent document claims the benefit of DE 102015224331.1, filed on Dec. 4, 2015, which is hereby incorporated by reference in its entirety.

BACKGROUND

The present embodiments relate to a method for adapting the brightness of an X-ray image recorded using a filter, with the filter attenuating, differently in at least two spatial filter regions, the X-ray radiation used for recording the X-ray image. The present embodiments also relate to an X-ray device, a computer program and an electronically readable data medium.

It is known for medical interventions (e.g., minimally invasive interventions) to be performed under X-ray monitoring. In such cases, X-ray images of a recording area, including the intervention area (e.g., the target area), are recorded with an X-ray device continuously and/or cyclically during the intervention and displayed to the at least one person performing the intervention. X-ray images of this type are frequently referred to as fluoroscopic images. Instruments, such as a catheter, used within the scope of the intervention, and/or changes occurring as a result of the intervention may be observed on such X-ray images.

X-ray radiation has an ionizing effect such that a patient and/or other persons involved in the intervention are exposed, during the intervention, to an X-ray dose. The X-ray dose should be kept as low as possible. In order to reduce the X-ray radiation exposure (e.g., for the patient), it has been proposed that a filter is connected downstream of the X-ray source of the X-ray device attenuating the X-ray radiation at least in less relevant portions of the region recorded (e.g., the field of vision of the X-ray device). This is based on the idea that there is frequently only one target region within the region recorded that is relevant for the observer (e.g., a person performing an intervention). Such a target region is frequently referred to as a "region of interest" (ROI), and a corresponding filter may be referred to as an ROI filter. An exemplary design provides that the filter has a central (e.g., circular) filter region in which no attenuation of the X-ray radiation is carried out. This inner filter region is to be directed at the target region (ROI). The inner filter region is surrounded by a further filter region that has a fixed attenuation value such that the filter, in this example, includes a total of two filter regions in which the X-ray radiation is attenuated differently (e.g., not at all in the inner filter region and based on a fixed attenuation value in the outer filter region). Other forms/designs of such an ROI filter are also conceivable (e.g., having other forms of inner filter region and/or a larger number of different filter regions). A filter of this type may be integrated in the housing of the X-ray source and has changeable filter regions (e.g., an inner filter region is movable and/or changeable in size). This makes it possible to reduce drastically overall the X-ray dose that the patient and the other persons in the intervention room are exposed.

An example of an ROI filter of this type is disclosed in U.S. Pat. No. 5,278,887. The filter component there, to be used during fluoroscopy, does not allow for attenuated X-ray radiation for recording a region of interest (ROI) selected by the physician, and a high-intensity low-noise X-ray image is therefore produced. In the regions of the recorded region surrounding the target region, an attenuated radiation is used that provides a less intensive, rather noisy image. Here, between the filter regions (e.g., the inner filter region assigned to the ROI) and the outer filter region having a fixed attenuation value, a transition region may be provided in which the thickness of the filter and/or the attenuation value preferably increase(s) in a linear manner.

Before fluoroscopic X-ray images are displayed to the at least one person performing the intervention and/or are otherwise processed further, the images are usually subjected to image processing (e.g., that accentuates edges, reduces noise and the like). The use of the filter gives rise to an X-ray image that has different brightnesses in the image regions assigned to the different filter regions, and therefore mapping these filter regions presents a problem for some image processing algorithms. Moreover, X-ray images of an even brightness and/or intensity distribution are easier for medical personnel (e.g., persons involved in an intervention) to interpret. It is therefore useful to undertake a brightness adaptation of the X-ray images such that the X-ray images appear as similar as possible in all image regions.

To this end, in U.S. Pat. No. 5,278,887 discusses a real-time image processing system was proposed that averages values of the intensities, ultimately averaging the image values, forming, in the various image regions in order to obtain, based upon these average values, a brightness adaptation through a linear, analytically derived transformation. For transition regions, an approach is proposed that examines the profile within the transition region in a linearized manner. However, this gives rise to a plurality of disadvantages. Due to the fact that the average value is generally formed across all image values in the image regions, no consideration is given to whether and to what extent an average identical image value, therefore an average identical brightness, is expected. Therefore, depending on the anatomy recorded, brightness differences in the image regions may occur. This also applies to the transition regions considered separately. This may lead to X-ray images that are inadequately improved in terms of their quality.

Newer X-ray devices, intended to be used within the scope of medical interventions, often also have functionalities that may automatically adapt the ROI filter (e.g., with regard to the target region (ROI)). To this end, it has been proposed that the viewing direction of a person performing the intervention be determined with the aid of eye tracking technologies and that the location of the ROI, and the position the non-attenuating (e.g., the inner, filter region), be adapted depending on this viewing direction. For example, a proposal of this type is described in US 2012/0187312. Frequently changing filter settings, and the different anatomies located in the focus of attention, further exacerbates the problems with brightness adaptation as proposed by the prior art, as there are constantly different situations arising that result in brightness adaptation of different levels of quality.

SUMMARY AND DESCRIPTION

The scope of the present invention is defined solely by the appended claims and is not affected to any degree by the statements within this summary.

The present embodiments may obviate one or more of the drawbacks or limitations in the related art. For example, improved brightness adaptation in X-ray images recorded with an ROI filter is provided.

A method a method for adapting the brightness of an X-ray image recorded using a filter is provided. The method includes determining image regions mapping the filter regions from filter parameters and recording-geometry parameters describing the filter regions and from at least one evaluation line running (e.g., perpendicular to a boundary) between image regions. For each evaluation line, the method includes determining a correction value describing the difference in brightness between the image regions from the image value profile along the evaluation line in an evaluation area containing the boundary, determining at least one correction factor from the at least one correction value and adapting the brightness between the at least two image regions through scaling of the image values with the correction factor.

The method may be used in the fluoroscopic monitoring of a medical intervention (e.g., a minimally invasive intervention), and a filter with spatially different attenuation (e.g., the ROI filter described) is therefore used. The filter has different filter regions where X-ray radiation used for recording the X-ray image is attenuated differently (e.g., no X-ray radiation in an inner filter region provided for recording the target region (ROI) and a fixed attenuation value in at least another filter region surrounding the inner filter region). The use of the filter (e.g., integrated in the housing of the X-ray source) has the consequence that the recorded region (e.g., visible on the X-ray image) of the recorded object (e.g., the patient) was exposed in at least two subregions. Each subregion corresponds to a filter region and to different incident X-ray radiation intensity, leading to different brightnesses despite equal attenuation by the object in different image regions of the X-ray image (e.g., the image regions corresponding to the mappings of the filter regions). Where the recording geometry is known, the filter properties (e.g., of the attenuation values) are known and the position/location of the filter regions is known and the location of the image regions in the X-ray image may be inferred by making corresponding geometric observations.

The filter may be controllable such that the filter regions may be changed. For example, a non-attenuating filter area may be directed at the target region (ROI) and may be changeable in position depending on user inputs and/or tracking of the viewing direction of a user. Linear motors may be provided as actuators for this purpose. Because the filter is may be controlled via the control device of the X-ray device itself, the relevant filter parameters describing the position of the filter regions are, like the recording-geometry parameters that describe the recording geometry, available centrally and may be used to determine the location of the image regions in the X-ray image corresponding to the filter regions. Transition regions (e.g., such as have a filter thickness increasing in a linear manner) may also be filter regions, but defined adjacent filter regions may be used, each regions with a fixed attenuation value (possibly even of zero).

By determining the spatial location of the image regions, the filter parameters (e.g., describing the current spatial location of the filter regions) and recording-geometry parameters may be to assess a hypothesis for the location of the image regions assigned to the filter regions. The hypothesis is checked and/or refined based on images. For example, when the filter parameters and/or the recording-geometry parameters are not available sufficiently, accurately or reliably, refining the determination of the position of the image regions based on images may be provided. For example, after rough positioning in the form of at least one hypothesis for the filter region, corresponding forms may be laid over the X-ray image in the position of the hypothesis and a correlation variable may be determined with the actual image data. The correlation variable may be used as part of an optimization method (e.g., moving the form in order to perform fine positioning or to select from several hypotheses one that has the best correlation).

As the basis for the brightness adaptation, the method includes using evaluation lines (e.g., running essentially perpendicular to boundaries between image regions). Brightness profiles, and thus the image data profile, along the evaluation lines may be evaluated to determine brightness differences in the image areas. The use of such pinpointed evaluation lines opens up a plurality of new options for improving the overall image quality (e.g., assessing transition areas as a suitable determination of correction values, obtaining additional information about the image value profile in the transition area between image regions and the like). More targeted brightness adaptation is provided, based on an improved database, delivering brightness-adapted X-ray images of high quality. If additional image-processing algorithms are used and/or if displayed, the high quality brightness-adapted X-ray images form a particularly sound basis for further use of the X-ray images. For example, acceptable, usable X-ray images may be obtained by persons performing a medical intervention or medical personnel generally, despite the use of an ROI filter.

The evaluation area, over which the image data profile is considered, depending on the application and/or properties of the X-ray device (e.g., the recording arrangement of the X-ray device), may be defined as extending on both sides of the boundary for a predetermined number of pixels, as extending as far as predefined edge points (e.g., the image edge, image center, and/or region center) and the like. For example, information about the expected extent of a transition area between the different brightnesses, assuming that a homogeneous image area is being considered, may be factored into the choice of the extent of the evaluation area. Factors responsible relate to the direction of impingement of the X-ray radiation on boundaries of filter regions as well as factors relating to the specific properties of the filter at the boundaries.

At least one evaluation line may be chosen as running along rows and/or columns of the X-ray image, making it easy to identify the brightness profiles along the evaluation lines. For example, this type of approach may be used where filter regions are substantially rectangular in design and their boundaries run in line with the pixel directions of the X-ray detector used (e.g., a solid state X-ray detector such as a flat detector having detector elements distributed matrix-like being used). However, this approach may also be used for other cases (e.g., the oft-used circular design of filter regions). Virtual image values along the evaluation line may be determined from the image values of the X-ray image by a coordinate transformation and/or a rebinning. The recorded original image values are resorted and/or rewritten into a suitable coordinate system such that image value profiles along the evaluation lines are produced easily. A coordinate system into which the values are transformed may be deliberately set such that in a single coordinate transformation suitable virtual image values is produced for several, or even all, of the evaluation lines to be used. For example, if a filter with an inner circular filter region for the target region (ROI) is used, a coordinate system to which values are transformed may be a polar coordinate system with a center point corresponding to the center point of the image region and corresponding to the inner filter region (e.g., as the evaluation lines run radially out from this center point).

The implementation of the coordinate transformation and/or the rebinning is restricted to an application area described by the extension of the evaluation areas. The coordinate transformation and/or the rebinning may be limited substantially to the image areas wherein it is needed, saving calculation time and effort.

The correction factor may be applied at least in part to the transformed and/or rebinned image values, whereupon the corrected image values in the original X-ray image may be determined through back-transformation. A minimally attenuated image region that is not to be modified may be loaded with the data of the original X-ray image (e.g., to refrain from any modifications in an image region showing the target region (ROI)).

In order to prevent interpolation artifacts due to coordinate transformation and/or rebinning, a suitable oversampling method may be used. For example, oversampling provides a higher resolution than is ultimately needed for determining the image value profiles along the evaluation lines. Where a transformation into polar coordinates is to be made, the angular increment may be made chosen depending on the maximum radius of the image area to be transformed (e.g., such that a pixel produced in polar coordinates substantially matches a pixel in the original coordinate system).

A plurality of candidate lines are determined along the boundary between two image regions, and the candidate lines fulfilling a homogeneity criterion for the image value profile in the evaluation area on the part of the two regions used as evaluation lines. The use of evaluation lines along which correction values are determined makes it possible to select evaluation lines from among the available set of evaluation line such that the selected evaluation lines connect homogenous areas to one another. The homogeneity criterion describes, at the boundary, a transition from a homogeneous area adjacent to the boundary of the one image region to a homogeneous area adjacent to the boundary of the other image region. In this way, evaluation lines are chosen that contain the desired information about the brightness difference factored into or forming the correction value.

To implement the homogeneity criterion, within the scope of the homogeneity criterion, the image value profile in the evaluation area is fitted to a predefined transition function describing a transition between homogeneous areas in the two image regions, the homogeneity criterion is fulfilled if a quality value describing the fit quality exceeds a limit value. Many algorithms that attempt to adapt a function to a predefined profile already have inherent values that may be used as quality values (e.g., correlation values, regression values and the like). For example, a sigmoid function that runs in an S-shape may be used as a transition function. An example of such a sigmoid function is provided as equation 1:

$$f(x)=1/(1+e^{\wedge}(k*(x+x0))) \qquad (Eq.\ 1)$$

In equation 1, the parameter k depends on the X-ray spectrum used (e.g., and may be derived for example from experiments) and the parameter x0 is the fit parameter (e.g., and may be determined by minimizing the least-squares error). The transition function and/or at least one transition-function parameter describing the form of the transition function may be chosen depending on the X-ray spectrum used for the recording and/or a calibration measurement.

The remaining deviation of the fitted transition function from the actual image value profile shows whether the homogeneity criterion has been fulfilled. For example, a correlation value may be used as a quality value.

The limit value may be chosen depending on the quality values of the candidate lines (e.g., such that a predefined percentage of the candidate lines fulfills the homogeneity criterion). For example, a correction value may be determined from the N % of the image value profiles that have the greatest correlation coefficient. For example, N may be chosen between 30 and 70% (e.g., 50%). Thus, the underlying data taken as a basis may be sufficient for determining the correction factor, in that a predefinable number of evaluation lines is considered as the most suitable.

Not all conceivable evaluation lines have to be considered, and it may be advisable to restrict the number of candidate lines by predefining an increment along the boundary between image regions. For candidate lines or evaluation lines emanating from a center point of a circular image region, a defined angular increment may be provided, and defining a number of chosen candidate lines. If no homogeneity criteria are used the evaluation lines may be selected directly based on an increment along the boundary.

The brightness may be adapted to the brightness level of an excellent reference image region that is assigned to a filter region of minimal attenuation. If an ROI filter having an inner, non-attenuating filter region is used (e.g., as a through opening), the assigned image region may be used as a reference image region (e.g., as modifications may not be desirable). In the at least one other image region not corresponding to the reference image region, the at least one correction factor relating to the brightness or intensity in the reference image region is applied. For example, if only two filter regions exist, and therefore also two image regions, a brightness difference, having to be evened out such that the correction factor may be determined directly from the correction values, is ultimately produced relatively directly from the correction values. For example, if a single evaluation line describing the transition between homogeneous areas is used, the ratio and/or the difference of the image values in the respective homogeneous areas of the image regions may be used as the correction value. If there are a plurality of evaluation lines, average values of such ratios may be used.

For each image region to be adapted, a single correction factor, to be applied globally in the image region, may be defined (e.g., through statistical observation of the correction values of individual evaluation lines). For each image region that is to be adapted in its brightness (e.g., therefore each image region other than a reference image region), a global brightness correction factor is determined and applied to the image values in the respective image region. However, in a transition area between image regions, a global brightness correction factor may not be determined and applied.

For the individual image regions, a spatially resolved correction factor may be determined (e.g., a value for the correction factor may be assigned to each subregion of the image region). Brightness fluctuations in the image regions, arising due to the properties of the recording arrangement as a whole or of the filter, may be managed (e.g., edges are inserted in the image in adjacent subregions due to the different values of the correction factor because the different values are undesirable and not intuitive). In the boundary areas between subregions of different values of the correction factor, an interpolation is performed to prevent brightness discontinuities. Suitable interpolation methods may be used to prevent the introduction of sharp edges between subregions if possible (e.g., not to introduce new artificial structures into the image).

When an image series of X-ray images is recorded, a correction factor determined for a previous X-ray image with the same filter setting is used in X-ray images recorded later and/or is taken into consideration in determining new correction factors for such X-ray images. The history of correction factors for adapting brightness may be taken into consideration in order to improve the brightness adaptation and/or reduce the computational outlay. For example, if neither the position of the filter regions of the filter nor the recording geometry between two (e.g., fluoroscopic) recordings has changed, the same correction factors may be used for the corresponding X-ray images. However, newly acquired information may be used, thus the newly recorded X-ray image may be used (e.g., in order to improve the determination of the at least one correction factor statistically by determining correction values afresh and in the determination of the correction factors the correction factors of preceding X-ray images recorded in the same overall configuration). However, findings from preceding (e.g., fluoroscopic) recording processes may be reused with regard to changed settings (e.g., a changed position of the filter regions). For example, a basic expectation in respect of the brightness difference already exists (e.g., because the attenuation values of the individual filter regions), irrespective of positioning of the regions, to remain in many cases the same, even if filter values are changeable. Through a priori knowledge, a significant improvement in determining the at least one correction factor may be achieved in a plurality of cases (e.g., during a fluoroscopic monitoring process where a plurality of X-ray images is recorded).

To map a blurred brightness transition between image regions in a transition area along the boundary between the image regions, a correction factor profile describing a smooth transition between the correction factors of the image regions may be applied instead of the correction factors of the image regions. This may also be used when no correction is made in an image region represented by an appropriate correction factor (e.g., one). Due to the proximity of the ROI filter to the focal point of the X-ray source, the edge of a more powerfully attenuating filter region of the filter may not be mapped as a sharp edge in the X-ray images. Instead, a profile emerges stemming principally from the geometric properties of the relevant perspective representation. However, this implementation recognizes that the filter transition regions between the filter regions exist having a variable attenuation value. A wide transition area is produced in the X-ray image. Because the brightness in the X-ray image no longer changes abruptly between image regions, image quality may be increased by creating in the transition area a smooth transition between the respective correction factors (e.g., one for no multiplicative correction). Using in a narrow, clearly defined area, a spatially varying correction factor is used to maximize the image quality.

When a fit in a homogeneity criterion is used, at least one fit information describing at least one fitted transition function is used for defining the correction factor profile. Thus, the knowledge already accumulated in the selection of suitable evaluation lines from candidate lines about how the transition between the image regions is structured may be used to derive an appropriate correction factor profile (e.g., providing that in these areas that the brightness is adapted correctly).

A discontinuity (e.g., an edge) may also be desired in the transition area between image regions and may be deliberately accepted (e.g., where the boundary to an image region, corresponding to an inner filter region where no attenuation is taking place, shows the target region of interest (ROI)). Due to the application of the correction factor without a correction factor profile, an edge may emerge reproducing the border of the relevant image region naturally. As such, a selection option may be provided for the user in an interface (e.g., where the user may specify whether a smooth transition or an edge-like transition is desired).

An application of the present embodiments arises when an ROI filter is used having an inner, non-attenuating filter region that is circular and is to be directed toward a target region inside the recorded region covered by the field of vision. Where a filter having a circular (e.g., non-attenuating) inner filter region to be directed toward a target region of the recorded region of the object to be recorded and an attenuating filter region surrounding said inner filter region is used for determining the evaluation lines and the associated image value profiles, a center point of the image region assigned to the inner filter region is determined and, to determine the virtual image values for the evaluation lines extending radially outwardly from this center point, the X-ray image is transformed into a polar coordinate system. In a polar coordinate system of this type, the columns correspond to different angles, and to different candidate lines or evaluation lines, such that the image value profiles along candidate lines/evaluation lines may be retrieved and determined easily.

In addition to the method, the present embodiments include an X-ray device with a recording arrangement having an X-ray source with an assigned, controllable filter and a control device configured for implementing the method discussed above. All statements in respect of the method discussed above apply to the X-ray device, such that the advantages of the method may also be obtained with said X-ray device. For example, filter parameters are available in the control device describing the current setting of the filter (e.g., the location of the filter regions and recording parameters describing the recording geometry). An image region determining unit of the control device locates image regions mapping the filter regions. An evaluation line determining unit selects suitable evaluation lines (e.g., perpendicular to a boundary to image regions) from candidate lines using a homogeneity criterion. The evaluation line determining unit may be connected to a transformation unit that may determine virtual image values along the evaluation line or candidate line. In a correction value determining unit of the control device, correction values for the evaluation lines are determined from the image value profile along the evaluation line in an evaluation area containing the boundary, such that a correction unit may determine the at least one correction factor from the at least one correction value and may correct the image values correspondingly to adapt the brightness.

The present embodiments also provide a computer program implementing the acts of a method discussed above when the program is executed on a computing device (e.g., the control device of the X-ray device). Finally, the present embodiments also provide an electronically readable data medium on which a computer program as discussed above is stored, such that when the electronically readable data medium is read by a computing device, the acts of the method discussed above are implemented. The data medium may be a non-transient data medium (e.g., a CD-ROM). The statements made previously in relation to the method dis-

DETAILED DESCRIPTION

Figure 1:
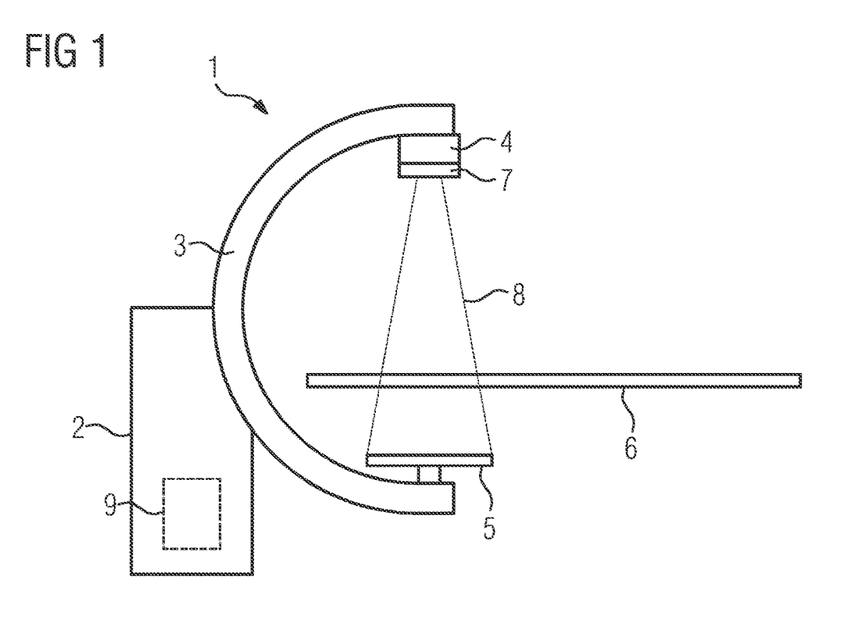
FIG. 1 shows a schematic diagram of an X-ray device according to an embodiment.

FIG. 1 shows a schematic diagram of one embodiment of an X-ray device 1. The X-ray device includes a C-arm 3 mounted on a stand 2. An X-ray source 4 and an X-ray detector 5 are arranged opposite each other on the C-arm 3. Using the C-arm 3 and movement devices of the C-arm 3 (not shown in detail), images of a patient arranged on a patient bed 6 (e.g., fluoroscopic X-ray images during a medical intervention) may be recorded from different projection directions.

Integrated in the housing of the X-ray source 4, a filter 7 (e.g., an ROI filter 7) allowing different regions in the field of vision of the X-ray device 1 to be exposed to different radiation intensities is provided. The field of vision is defined by the radiation field 8.

The X-ray detector 5 may be a solid state flat detector having a plurality of detector elements arranged in matrix-like row and columns.

The X-ray device 1 also includes a control device 9 (indicated only schematically) configured for performing a method according to the one or more of the present embodiments.

Figure 2:
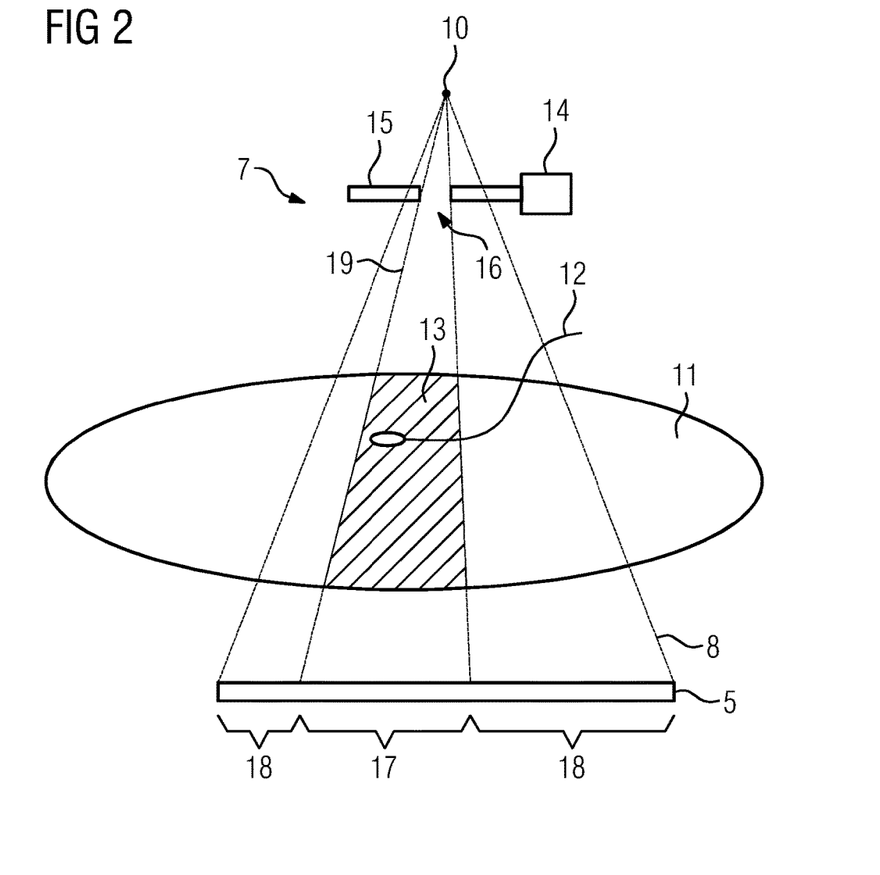
FIG. 2 shows an ROI filter used in the X-ray device according to an embodiment.

FIG. 2 shows exemplary functioning of the filter 7. A radiation field 8 emanates from the focal point 10 of the X-ray source 4 (e.g., the radiation field may cover the entire detector 5). A patient 11 (only indicated), in whom a medical instrument 12 is introduced (e.g., in the form of a catheter), is partially transilluminated by the X-rays. The radiation field 8 may define only an entire recording region inside the patient 11 and in high resolution for the person performing the intervention (e.g., as this person is interested only in the operating area of the medical instrument 12, depicted as hatched target region 13). The region may not necessarily be of interest in its entirety.

The filter 7 has an attenuating filter element 15. The filter element 15 is movable via at least one actuator 14 (shown in FIG. 2 only schematically) controlled by the control device 9 and having a circular through opening 16 (otherwise having the same attenuation value throughout).

In the diagram shown in FIG. 2, the filter element 15 is positioned by actuator system 14 such that the non-attenuated X-rays passing through the opening 16 penetrate the target region 13 and are received correspondingly in an image region 17 on the detector 5.

The remaining X-ray radiation outside the cone, delimited by the lines 19, is attenuated by the filter element 15 and strikes the patient 11 as the object with lower intensity. The X-ray radiation is received in an outer image area 18 surrounding the inner round image area 17 by the X-ray detector 5, and a brightness difference emerges between the image area 17 and the image area 18. This brightness difference is, prior to image processing of recorded X-ray images, corrected by the exemplary embodiments discussed below.

With regard to FIG. 2, the filter element 15 and the opening 16 may define two filter regions of differing attenuations mapped onto the corresponding image regions 17, 18.

Figure 3:
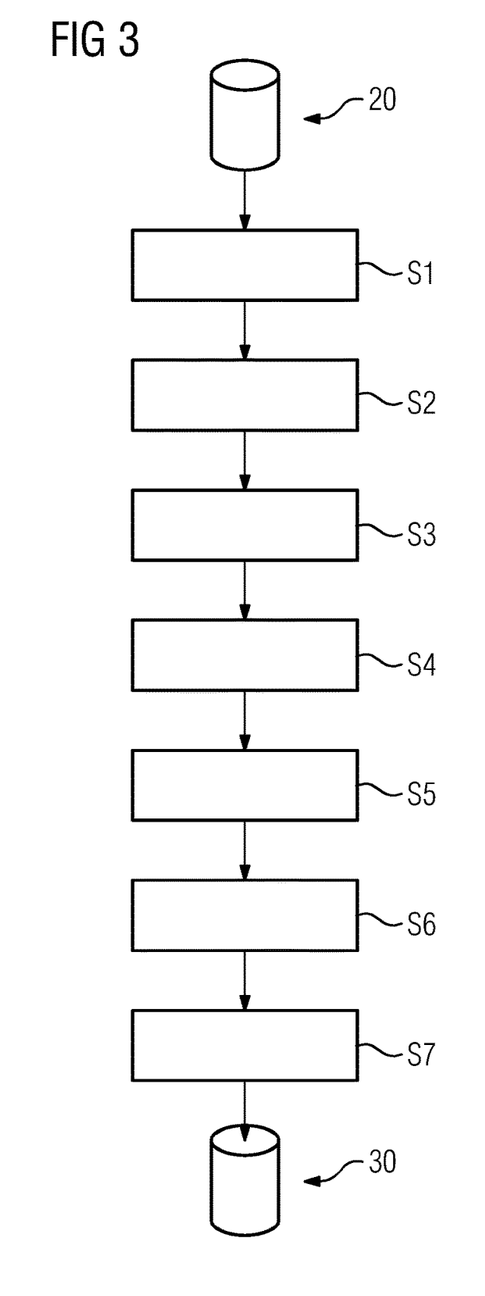
FIG. 3 shows a flow diagram of an exemplary embodiment of a method.
Figure 4:
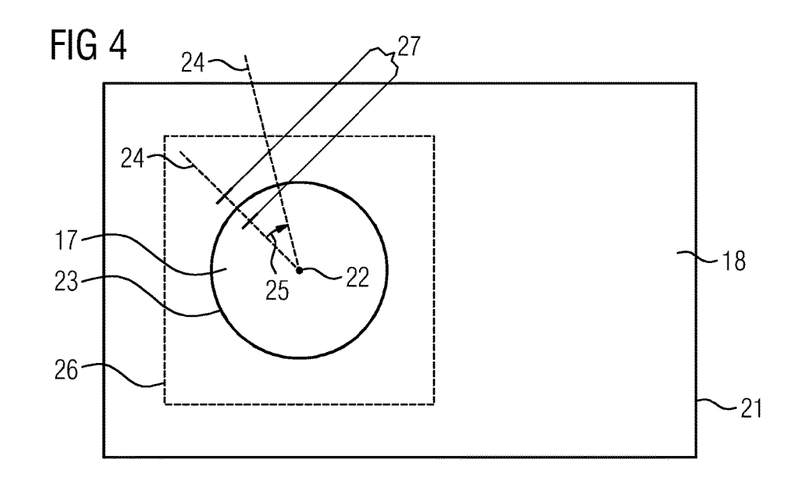
FIG. 4 shows image areas in an X-ray image according to an embodiment.

The method depicted in FIG. 3 uses the original image data 20 of the recorded X-ray image (e.g., a fluoroscopic image). In act S1, the filter parameters and recording-geometry parameters present in the X-ray device (e.g., parameters describing the properties and the current setting of the filter 7, the recording geometry, respectively, and other relevant information such as a zoom factor) are used to locate the image region 17 and to determine the center point of the image region 17. FIG. 4 shows the circular inner image region 17, mapping the target region 13, and the image region 18 surrounding the circular inner image region 17 (e.g., appearing darker due to the attenuation of the X-ray radiation) in the X-ray image 21. The center point 22 of the image region 17 is shown, as is the boundary 23 between the image regions 17 and 18.

If it is not possible to determine the position of the image area 17 precisely enough from the filter parameter and the recording-geometry parameters, an image-based refinement may be made by inserting a circular form at the hypothesized position of the image region 17 in the X-ray image 21 and checking (e.g., and if necessary optimizing) the correlation. In the case of a plurality of hypotheses, the hypothesis with the highest correlation may be selected. Image processing methods for determining appropriate correlation variables are already known.

In act S2, a coordinate transformation (e.g., effectively a rebinning of the X-ray image 21 into a polar coordinate system with an origin in the center point 22 of the image region 17) is performed. The purpose of the coordinate transformation is that candidate lines for evaluation lines may be observed (e.g., the lines standing as perpendicular as possible on the boundary 23). However, this applies to lines emanating radially from the center point 22. Two candidate lines 24 that are spaced apart by an angular increment 25 are indicated in FIG. 4 by way of example. In the case of image values in the polar coordinate system, the image value profiles along radial lines 24 correspond exactly to columns of the correspondingly transformed X-ray image 21, such that image value profiles may be examined easily.

To avoid interpolation errors, the angular increment for the transformation to the polar coordinate system may be chosen depending on the maximum radius of the transformed image area, and suitable oversampling may be carried out.

The whole of the X-ray image 21 may be transformed to the polar coordinate system, but also may be restricted to an application area 26, stemming from the fact that the image value profiles along candidate lines 24 or evaluation lines are analyzed more precisely only in an evaluation area 27. The evaluation area 27 is broadly defined in the present case, taking into account a priori knowledge about the imaging behavior of the filter 7 and the maximum width of transition areas between the image areas 17, 18 (e.g., as a particular number of pixels on either side of the boundary 23). The application area 26 may be placed such that all possible evaluation areas 27 are fully contained in the application area 26.

In act S3 depicted in FIG. 3, the candidate lines 24 are determined by selecting candidate lines 24 spaced apart by a particular angular increment 25. For each of the candidate lines 24, an image value profile in the evaluation area 27 is derived as a column in the X-ray image 21 transformed into the polar coordinate system.

In act S4, evaluation lines are determined from the candidate lines 24 by checking each of the image value profiles against a homogeneity criterion. The homogeneity criterion describes, at the boundary 23, a transition from a homogeneous area of the one image region 17, 18 adjacent to the boundary 23 to a homogeneous area of the other image region 18, 17 adjacent to the boundary 23. To this end (e.g., within the scope of the homogeneity criterion) the image value profile in the evaluation area 27 is fitted to a predefined transition function. For example, a sigmoid function (e.g., equation 1 below) may be used:

$$f(x)=1/(1+e^{\wedge}(k*(x+x0))) \tag{Eq. 1}$$

In equation 1, the parameter k is dependent on the X-ray spectrum used (e.g., measured by appropriate calibration measurements), and the parameter x0 is the fit parameter (e.g., defined such that the least-squares error is minimized).

Figure 5:
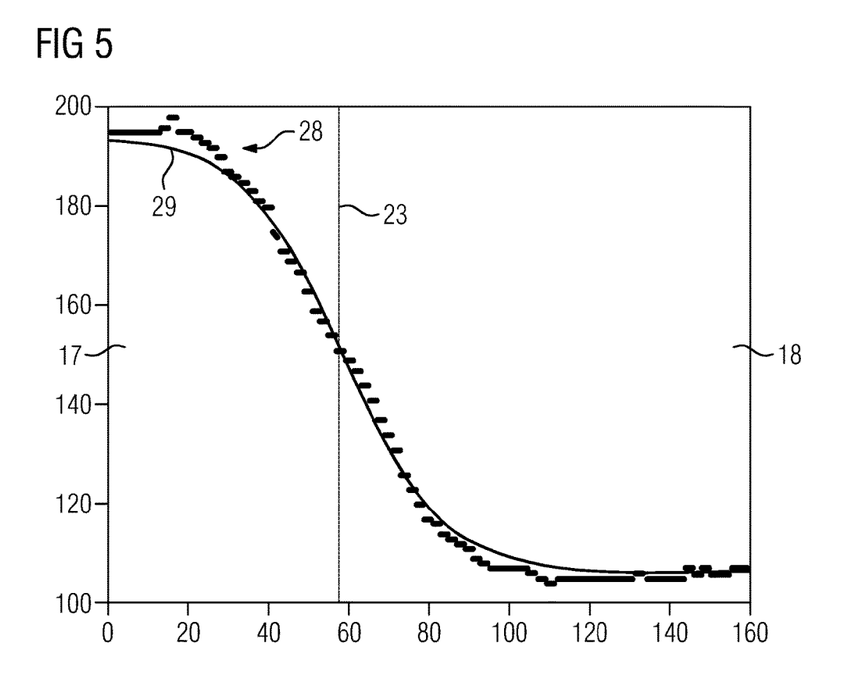
FIG. 5 shows an image value profile and a fitted transition function according to an embodiment.

An example is shown in FIG. 5. In FIG. 5, the points 28 symbolize the image value profile, and the curve 29 symbolizes the fitted transition function. The location of the boundary 23 is also shown. A smooth transition occurs between two substantially homogeneous areas, such that a high correlation value for the fit is provided (e.g., indicating that the curve 29 reflects the image value profile well and that the deviations are small). However, the corresponding candidate line may not be selected as an evaluation line because the limit value, which the correlation value is to exceed as a quality value in the homogeneity criterion, is chosen dynamically (e.g., such that 50% of the candidate lines 24 are selected as evaluation lines). This provides that an adequate number of evaluation lines are available, and that the candidate lines 24 most likely to be showing a transition between homogeneous areas candidate lines 24 are selected (e.g., candidate lines 24 with the highest correlation values).

In act S5, correction values are defined for the evaluation lines (e.g., as the ratio of the image values in the homogeneous part of the image region 17 outside the transition area) to the image values in the homogeneous area of the image region 18.

The image region 17 (e.g., where non-attenuated radiation is incident) serves as a reference image region toward which adaptations are to be made (e.g., the image values are not changed and correspond to a correction factor of 1. In act S6, a global correction factor for die image region 18 is determined from the individual correction values (e.g., constituting local correction factors, such as through statistical averaging). A weighting may be applied using the correlation values. In act S7, the image values in the image region 18 are multiplied with the global correction factor for the image region 18 to obtain the adaptation.

To optimize the image quality in the transition area, as shown in FIG. 5, a smooth progression of the correction factor from the defined global correction factor to the intended correction factor of 1 in the image region 17 may be used to achieve the correction in the transition area. Information on the value profile in the transition area is already known from the observations in the homogeneity criterion (e.g., the description by the fitted transition function, curve 29, being available). This fit information may be used in order to recreate, in the transition areas, the smooth transition in accordance with the course of the curve 29, providing a locally different correction factor to further improve image quality. This type of local correction in the transition area is useful, such as in locations where the transition area extends over a plurality of pixels. The local correction in the transition area may also be performed on the transformed virtual image values in the polar coordinate system (e.g., that are back-transformed so as to produce corrected image values). The original image data may remain unchanged in the image area 17 outside the transition area, however, as this data is not intended to be changed.

Correlated image data 30 is available. The correlated image data 30 may be subjected to further image processing and/or may be displayed to a person performing the intervention.

Other embodiments in which the image region 18 is subdivided into subareas (e.g., as arc segments) are provided. Each of the subareas may be assigned different correction factors, derived from the local correction values. It is useful to interpolate between these subregions to provide a smooth transition (e.g., without sharp edges) based on different correction factors.

In the case of repeated recording of X-ray images 21 (e.g., as part of fluoroscopic monitoring), correction factors of preceding X-ray images 21 are considered (e.g., used directly) if the recording geometry and the filter settings have not changed, or the correction factors of preceding X-ray images are considered at least in the determination of new correction factors.

Although the invention has been illustrated and described in greater detail by the exemplary embodiments, the invention is not restricted to the disclosed examples. Other variations may be derived herefrom by one skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for adapting a brightness of an X-ray image recorded using a filter to improve a quality of the X-ray image while attenuating, differently in at least two spatial filter regions, X-ray radiation used for recording the X-ray image, the method comprising:

determining, by a controller of an X-ray device, image regions of the X-ray image mapping the filter regions from filter parameters;

recording, by the controller, geometry parameters describing the filter regions from at least one evaluation line;

determining, by the controller, for each evaluation line, a correction value describing a difference in brightness between the image regions from an image value profile along the evaluation line in an evaluation area containing a boundary between the image regions;

determining, by the controller, at least one correction factor from the at least one correction value;

adapting, by the controller, the brightness between the image regions by scaling the image values with the correction factor; and displaying the X-ray image with the adapted brightness, wherein, when an image series of X-ray images is recorded, a correction factor determined for a first X-ray image with a same setting of the filter is used in a plurality of X-ray images recorded later, the correction factor determined for the first X-ray image is taken into consideration in determining new correction factors for the plurality of X-ray images, or a combination thereof.

2. The method of claim 1, wherein the at least one evaluation line runs along rows, columns, or the rows and the columns of the X-ray image, wherein virtual image values along the evaluation line are determined from the image values of the X-ray image by a coordinate transformation, a rebinning, or the coordinate transformation and the rebinning, or a combination thereof.

3. The method of claim 1, further comprising:

determining a plurality of candidate lines along the boundary between the image regions; and using the plurality of candidate lines, fulfilling a homogeneity criterion for the image value profile in the evaluation area for the image regions, as evaluation lines.

4. The method of claim 1, wherein the adapting comprises adapting the brightness to a brightness level of a reference image region assigned to a filter region of minimal attenuation.

5. The method of claim 1, wherein, for each image region to be adapted, a single correction factor to be applied globally in the image region is determined.

6. The method of claim 5, wherein the single correction factor to be applied globally in the image region is determined using statistical observation of the correction values of individual evaluation lines.

7. The method of claim 1, wherein the at least one evaluation line runs perpendicular to the boundary between the image regions.

8. A method for adapting a brightness of an X-ray image recorded using a filter to improve a quality of the X-ray image while attenuating, differently in at least two spatial filter regions, X-ray radiation used for recording the X-ray image, the method comprising:

determining, by a controller of an X-ray device, image regions of the X-ray image mapping the filter regions from filter parameters;

determining, by the controller, a plurality of candidate lines along a boundary between two image regions;

using the plurality of candidate lines, fulfilling a homogeneity criterion for an image value profile in the evaluation area for the two image regions, as evaluation lines, wherein the homogeneity criterion describes, at the boundary, a transition from a homogeneous area of a first image region of the two image regions adjacent to the boundary to a homogeneous area of a second image region of the two image regions adjacent to the boundary;

recording, by the controller, geometry parameters describing the filter regions from the evaluation lines;

determining, by the controller, for each evaluation line, a correction value describing a difference in brightness between the image regions from the image value profile along the evaluation lines in an evaluation area containing the boundary;

determining, by the controller, at least one correction factor from the at least one correction value;

adapting, by the controller, the brightness between the two image regions by scaling the image values with the correction factor; and displaying the X-ray image with the adapted brightness.

9. A method for adapting a brightness of an X-ray image recorded using a filter to improve a quality of the X-ray image while attenuating, differently in at least two spatial filter regions, X-ray radiation used for recording the X-ray image, the method comprising:

determining, by a controller of an X-ray device, image regions of the X-ray image mapping the filter regions from filter parameters;

determining, by the controller, a plurality of candidate lines along a boundary between two image regions;

using the plurality of candidate lines, fulfilling a homogeneity criterion for the image value profile in the evaluation area for the two image regions, as evaluation lines, wherein, within a scope of the homogeneity criterion, the image value profile in the evaluation area is fitted to a predefined transition function describing a transition between homogeneous areas in the two image regions, and wherein the homogeneity criterion is deemed fulfilled if a quality value describing the quality of the fit exceeds a limit value;

recording, by the controller, geometry parameters describing the filter regions from the evaluation lines;

determining, by the controller, for each evaluation line, a correction value describing a difference in brightness between the image regions from the image value profile along the evaluation lines in an evaluation area containing the boundary;

determining, by the controller, at least one correction factor from the at least one correction value;

adapting, by the controller, the brightness between the two image regions by scaling the image values with the correction factor; and displaying the X-ray image with the adapted brightness.

10. The method of claim 9, wherein a sigmoid function is used as the transition function, a correlation value is used as the quality value, or a combination thereof, wherein the transition function, at least one transition-function parameter describing a concrete form of the transition function, or a combination thereof is chosen depending on the X-ray spectrum used for the recording, depending on a calibration measurement, or depending on a combination thereof, or a combination thereof.

11. The method of claim 9, wherein the limit value is chosen depending on the quality values of the candidate lines.

12. The method of claim 11, wherein a predefined percentage of the candidate lines fulfills the homogeneity criterion.

13. The method of claim 9, wherein, to map a blurred brightness transition between image regions in a transition area along the boundary between the image regions, a correction factor profile describing a smooth transition between the correction factors of the image regions is applied instead of the correction factors of the image regions.

14. The method of claim 13, wherein, when the image value profile in the evaluation area is fitted to a predefined transition function describing a transition between homogeneous areas in the image regions, at least one fit information describing at least one fitted transition function is used for defining the correction factor profile.

15. An X-ray device comprising:
a recording arrangement comprising an X-ray source and a controller, the X-ray source comprising an assigned, controllable filter, the controller being configured to:
determine image regions mapping filter regions from filter parameters;
record geometry parameters describing the filter regions from at least one evaluation line running perpendicular to a boundary between image regions;
determine, for each evaluation line, a correction value describing a difference in brightness between the image regions from an image value profile along the evaluation line in an evaluation area containing the boundary;
determine at least one correction factor from the at least one correction value;
adapt the brightness between the image regions by scaling the image values with the correction factor; and
display the X-ray image with the adapted brightness,
wherein, when an image series of X-ray images is recorded, a correction factor determined for a first X-ray image with a same setting of the filter is used in a plurality of X-ray images recorded later, the correction factor determined for the first X-ray image is taken into consideration in determining new correction factors for the plurality of X-ray images, or a combination thereof.

* * * * *